United States Patent
Baek et al.

(10) Patent No.: US 9,686,712 B2
(45) Date of Patent: Jun. 20, 2017

(54) METHOD AND DEVICE FOR SOLVING CONGESTION IN DEVICE TO DEVICE COMMUNICATION

(71) Applicant: Samsung Electronics Co., Ltd, Gyenoggi-do (KR)

(72) Inventors: Youngkyo Baek, Seoul (KR); Songyean Cho, Seoul (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 0 days.

(21) Appl. No.: 14/913,262

(22) PCT Filed: Aug. 19, 2014

(86) PCT No.: PCT/KR2014/007699
§ 371 (c)(1),
(2) Date: Feb. 19, 2016

(87) PCT Pub. No.: WO2015/026140
PCT Pub. Date: Feb. 26, 2015

(65) Prior Publication Data
US 2016/0205584 A1   Jul. 14, 2016

(30) Foreign Application Priority Data

Aug. 19, 2013   (KR) .................. 10-2013-0098033

(51) Int. Cl.
*H04B 1/00*   (2006.01)
*H04W 28/02*   (2009.01)
(Continued)

(52) U.S. Cl.
CPC ....... *H04W 28/0252* (2013.01); *H04W 24/08* (2013.01); *H04W 28/0289* (2013.01);
(Continued)

(58) Field of Classification Search
CPC ............. H04W 24/08; H04W 28/0252; H04W 28/0289; H04W 48/06; H04W 48/16;
(Continued)

(56) References Cited

U.S. PATENT DOCUMENTS 9,026,051 B2 * 5/2015 Etemad ................ H04W 76/02
370/338
9,148,842 B2 * 9/2015 Qi ........................ H04W 48/10
(Continued)

FOREIGN PATENT DOCUMENTS

KR   10-2010-0083040   7/2010
KR   10-2012-0006791   1/2012
(Continued)

OTHER PUBLICATIONS

International Search Report dated Nov. 24, 2014 in connection with International Patent Application No. PCT/KR2014/007699, 4 pages.
(Continued)

*Primary Examiner* — Tan H Trinh

(57) ABSTRACT

The present invention relates to a method and device for finding and solving congestion in a device to device (D2D) channel that may occur in D2D communication by a user terminal and enables the user terminal or a server to perceive and solve the congestion based on a result obtained by sensing the D2D channel by means of the user terminal.

18 Claims, 9 Drawing Sheets

(51) Int. Cl.
*H04W 24/08* (2009.01)
*H04W 72/04* (2009.01)
*H04W 72/12* (2009.01)
*H04W 48/16* (2009.01)
*H04W 48/06* (2009.01)
*H04W 88/06* (2009.01)
*H04W 88/08* (2009.01)

(52) U.S. Cl.
CPC .......... *H04W 48/06* (2013.01); *H04W 48/16* (2013.01); *H04W 72/0453* (2013.01); *H04W 72/1215* (2013.01); *H04W 88/06* (2013.01); *H04W 88/08* (2013.01)

(58) Field of Classification Search
CPC ......... H04W 72/0453; H04W 72/1215; H04W 88/06; H04W 88/08
USPC ....... 455/553.1, 452.1, 450, 419, 41.2, 41.1, 455/41.3, 500, 507, 509, 517, 524, 525, 455/550.1, 552.1, 561, 434; 370/338, 370/329, 237, 216, 328, 336, 310
See application file for complete search history.

(56) References Cited

U.S. PATENT DOCUMENTS

| | | | | |
|---|---|---|---|---|
| 2007/0042781 A1* | 2/2007 | Yavuz | ................ | H04W 36/18 455/445 |
| 2007/0150857 A1* | 6/2007 | Korkishko | ............ | G06F 21/645 717/106 |
| 2010/0177639 A1* | 7/2010 | Nam | ................... | H04W 72/082 370/237 |
| 2011/0153773 A1* | 6/2011 | Vandwalle | ............ | H04W 8/005 709/217 |
| 2012/0230178 A1* | 9/2012 | Wang | ................. | H04L 41/0627 370/216 |
| 2012/0300712 A1* | 11/2012 | Hakola | ............... | H04W 74/008 370/329 |
| 2013/0083779 A1* | 4/2013 | Ahn | ..................... | H04W 72/04 370/336 |
| 2013/0114448 A1 | 5/2013 | Koo | | |
| 2013/0195026 A1* | 8/2013 | Johnsson | .......... | H04W 72/0493 370/329 |
| 2013/0223398 A1* | 8/2013 | Li | ..................... | H04W 72/085 370/329 |
| 2014/0056220 A1* | 2/2014 | Poitau | ................ | H04W 40/246 370/328 |
| 2014/0357269 A1* | 12/2014 | Zhou | ................... | H04W 8/005 455/434 |
| 2015/0223257 A1* | 8/2015 | Wilhelmsson | ...... | H04W 76/023 455/452.1 |
| 2015/0282157 A1* | 10/2015 | Kim | ..................... | H04W 48/14 370/329 |
| 2016/0081039 A1* | 3/2016 | Lindoff | ............... | H04W 52/383 455/450 |
| 2016/0165411 A1* | 6/2016 | Lee | ........................ | H04W 4/08 455/426.1 |
| 2016/0183276 A1* | 6/2016 | Marinier | ............... | H04W 72/02 370/329 |
| 2016/0242048 A1* | 8/2016 | Pelletier | .............. | H04W 72/085 |

FOREIGN PATENT DOCUMENTS

| | | |
|---|---|---|
| KR | 10-2013-0035964 | 4/2013 |
| KR | 10-2013-0047642 | 5/2013 |

OTHER PUBLICATIONS

Written Opinion of the International Searching Authority dated Nov. 24, 2014 in connection with International Patent Application No. PCT/KR2014/007699, 5 pages.

\* cited by examiner

METHOD AND DEVICE FOR SOLVING CONGESTION IN DEVICE TO DEVICE COMMUNICATION

CROSS-REFERENCE TO RELATED APPLICATION(S)

The present application claims priority under 35 U.S.C. §365 to International Patent Application No. PCT/KR2014/007699 filed Aug. 19, 2014, entitled "METHOD AND DEVICE FOR SOLVING CONGESTOIN IN DEVICE TO DEVICE COMMUNICATION", and, through International Patent Application No. PCT/KR2014/007699, to Korean Patent Application No. 10-2013-0098033 filed Aug. 19, 2013, each of which are incorporated herein by reference into the present disclosure as if fully set forth herein.

TECHNICAL FIELD

The present disclosure relates to a method and apparatus for detecting and solving congestion, when congestion has occurred in a D2D channel used in Device-to-Device communication (D2D communication).

BACKGROUND ART

D2D communication is to perform terminal-to-terminal data communication without using a network (e.g., a cellular network) in order for a terminal to communicate with an adjacent terminal. In order for a terminal attempting D2D communication to discover an adjacent terminal of interest, the terminal may transmit and receive a message to and from the adjacent terminal or may receive assistance of a network. For example, a terminal attempting D2D communication may include information thereof in a discovery message and periodically transmit the discovery message. The adjacent terminal, having received the discovery message may recognize the existence of the terminal, having transmitted the discovery message through the information included in the discovery message. Such a method is referred to as an announce-monitoring mode. By the method, the terminal may discover a terminal of interest through a message transmitted from a terminal located at a periphery thereof.

DISCLOSURE OF INVENTION

Technical Problem

At a location at which terminals are concentrated, when the terminals transmit a discovery message, a channel that transmits and receives the discovery message is in a saturation state and thus there is a high possibility that transmission of the discovery message may fail due to collision between discovery messages.

Exemplary embodiments of the present disclosure provide an apparatus and method for detecting and solving a congestion state occurring in a channel that transmits and receives a discovery message.

Solution to Problem

In accordance with an aspect of the present disclosure, a method in which a user terminal solves congestion in D2D communication includes: sensing a D2D channel; determining whether the D2D channel is in a congestion state based on the sensing; and reducing, if the D2D channel is in a congestion state, the transmission number per time and transmitting a D2D message.

In accordance with another aspect of the present disclosure, a user terminal includes: a communication unit that senses a D2D channel; and a controller that determines whether the D2D channel is in a congestion state based on the sensing and that reduces the transmission number per time and that controls the communication unit to transmit a D2D message, if the D2D channel is in a congestion state.

In accordance with another aspect of the present disclosure, a method in which a server located on a network interworked with at least one user terminal solves congestion in D2D communication includes: receiving a report of sensing information of a D2D channel from the user terminal; determining whether the D2D channel is in a congestion state based on the sensing information; and transmitting, if the D2D channel is in a congestion state, a congestion state indication message to the user terminal and enabling the user terminal to reduce the transmission number per time of a D2D message.

In accordance with another aspect of the present disclosure, a server includes: a communication unit that receives sensing information of a D2D channel from a user terminal; and a controller that determines whether the D2D channel is in a congestion state based on the sensing information and that controls the communication unit to transmit a congestion state indication message to the user terminal and to reduce the transmission number per time of a D2D message, if the D2D channel is in a congestion state.

Advantageous Effects of Invention

According to an exemplary embodiment of the present disclosure, a terminal or a base station, having detected that congestion has occurred in a D2D channel performs a congestion control such as probable transmission limitation of a message or a change of a discovery method, thereby solving the congestion.

MODE FOR THE INVENTION

Figure 1:
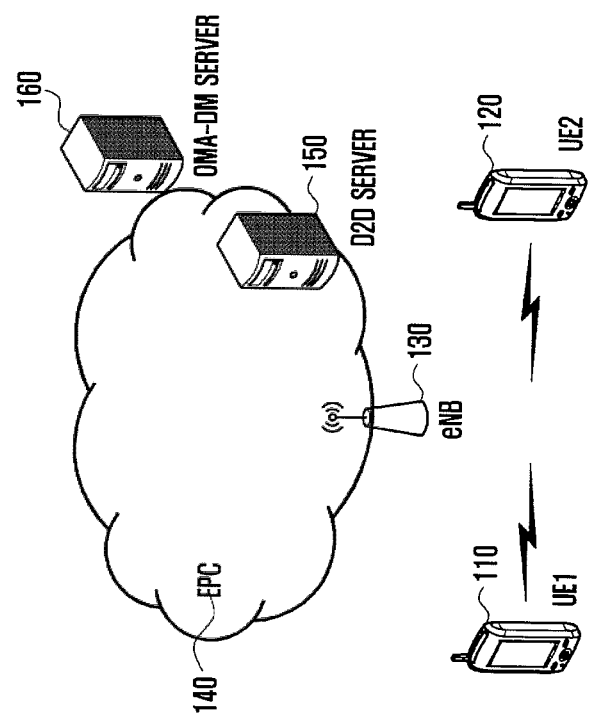
FIG. 1 is a diagram illustrating an environment that performs D2D communication according to an exemplary embodiment of the present disclosure.

The terms used in this specification and claims should not be construed as limited to general or dictionary meanings, and in order for an inventor to describe the invention with a best method, the invention should be interpreted with meanings and concepts corresponding to the spirit of the present disclosure based on a principle that can appropriately define concepts of terms. Therefore, embodiments described in this specification and a configuration shown in the drawing are merely a portion of various exemplary embodiments of the present disclosure and do not represent the entire sprit of the present disclosure and thus it should be understood that various equivalents and exemplary variations that can replace the exemplary embodiment may exist at an application time point of the present disclosure.

In this specification and claims, the word "comprising" does not imply the exclusion of other elements or operations. Unless explicitly described to the contrary, a single noun may include a plurality of nouns. For example, a "server" may indicate one server or may include at least two servers. A suffix "unit" of constituent elements is given in consideration of easiness of specification description and does not have a distinguishing meaning or function.

In this specification and claims, a "user terminal" may be referred to as terms such as a Mobile Station (MS), User Equipment (UE), wireless terminal, access terminal, subscriber unit, subscriber station, wireless device, wireless communication device, Wireless Transmit/Receive Unit (WTRU), and mobile node. The user terminal may include a tablet, Personal Computer (PC), Portable Multimedia Player (PMP), Personal Digital Assistant (PDA), smart phone, mobile terminal, and digital frame.

In this specification and claims, a "server" is a device located on a network interworked with a user terminal or interworked with the network. In this specification and claims, the server may include at least one of a base station (including eNB) that controls the network, D2D server interworked with the network, or OMA-DM server or ProSe function server interworked with the network.

In this specification and claims, a "D2D channel" may include both a discovery channel used for discovering a terminal and a communication channel used for data transmission and reception. The discovery channel and the communication channel may use the same frequency band. According to an exemplary embodiment of the present disclosure, when the discovery channel and the communication channel do not use the same frequency band, determination on whether there is a congestion state according to channel sensing and a congestion resolution may be performed on an each channel basis.

In this specification and claims, a "D2D message" is a message in which a terminal to perform D2D communication transmits to an adjacent terminal of interest. For example, a discovery message of an announce-monitoring mode or a search message of a search-response method may be included in the D2D message. According to an exemplary embodiment of the present disclosure, the D2D message may be transmitted and received through the D2D channel.

Hereinafter, various exemplary embodiments of the present disclosure will be described in detail with reference to the accompanying drawings. In the following description, only a portion necessary for understanding operation according to an exemplary embodiment of the present disclosure is described and a description of other portions may be omitted to avoid obscuring the subject matter of the present disclosure. Here, it should be understood that features of the present disclosure are not limited to the above-described illustrations and include a form change or additional functions of each element described herein. In the drawings, the magnitude of some elements may be enlarged for illustration, and the drawings are not intended to be to scale or to be correctly proportioned.

FIG. 1 is a diagram illustrating an environment that performs D2D communication according to an exemplary embodiment of the present disclosure.

A user terminal (UE) may perform D2D communication with another UE or may communicate with a base station that controls a network interworked with the UE. Referring to FIG. 1, a UE1, 110 and a UE2, 120 may communicate with an eNodeB 130 that controls an Evolved Packet Core (EPC) network 140. The EPC network 140 may interwork with a D2D server 150 or an Open Mobile Alliance-Device Management (OMA-DM) server 160. The D2D server 150 may set information related to D2D communication of the UE1 or the UE2. The OMA DM server 160 may define a protocol and data structure to enable remote access of data of the UE. The UE may store a management tree including at least one Management Object (MO). The MO may perform an interface function of the OMA-DM server. A network operator may change a discovery method or a setting value related to a congestion resolution of a D2D channel through the OMA-DM server 160. The D2D server 150 and the OMA-DM server 160 are the same entity and may be referred to as a ProSe Function server. Therefore, when describing the present disclosure, for convenience of description, a D2D server and an OMA DM server are used together, but operation in this specification may be analyzed as operation in one server, i.e., a ProSe function server.

In FIG. 1, as an example of a communication network, an EPC network is described, but the communication network is not limited thereto and a configuration of FIG. 1 may be applied to other communication networks.

Figure 2:
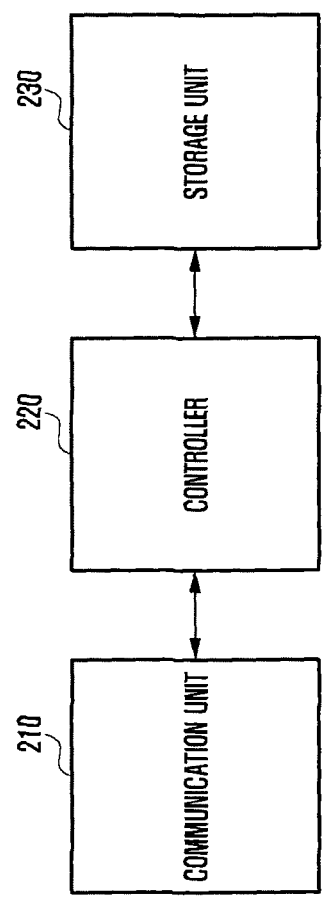
FIG. 2 is a block diagram illustrating a configuration of a user terminal according to an exemplary embodiment of the present disclosure.

FIG. 2 is a block diagram illustrating a configuration of a UE according to an exemplary embodiment of the present disclosure.

Referring to FIG. 2, the UE may include a communication unit 210, controller 220, and storage unit 230.

The communication unit 210 may form a communication channel for communication or data transmission and reception under the control of the controller 220. For example, the UE may sense a D2D channel through the communication unit 210.

The controller 220 may include a microprocessor or a microcomputer such as a Central Processing Unit (CPU) and a Digital Signal Processor (DSP). The controller 220 may determine that the UE senses a D2D channel and that the D2D channel is in a congestion state and control various signal flows for solving congestion. For example, if a D2D channel of the UE is in a congestion state, the controller 220 may control the communication unit 210 to reduce the transmission number per time of a D2D message. Further, the controller 220 may determine whether a D2D channel is in a congestion state based on at least one of an occupying rate of a resource block, an average consumption time taken for transmission of a D2D message, the average transmission trial number for a predetermined time, or an average consumption time for reception of a response message. Further, the controller 220 may determine whether a D2D channel is in a congestion state in consideration of information about a congestion possibility received from a server. Further, the controller 220 may determine a threshold based on sensing of a D2D channel, map a random value of each newly generated D2D message, and limit transmission of a D2D message corresponding to the random value based on a comparison result between magnitudes of the threshold and the random value. Further, if the D2D channel is in a congestion state based on sensing of the D2D channel, the controller 220 may change a discovery method.

The storage unit 230 may include a cache memory, D-ram, S-ram, flash memory, magnetic disk storage device, or optical disk storage device. The storage unit 230 may store information related to a congestion resolution of D2D communication and a D2D channel.

Figure 3:
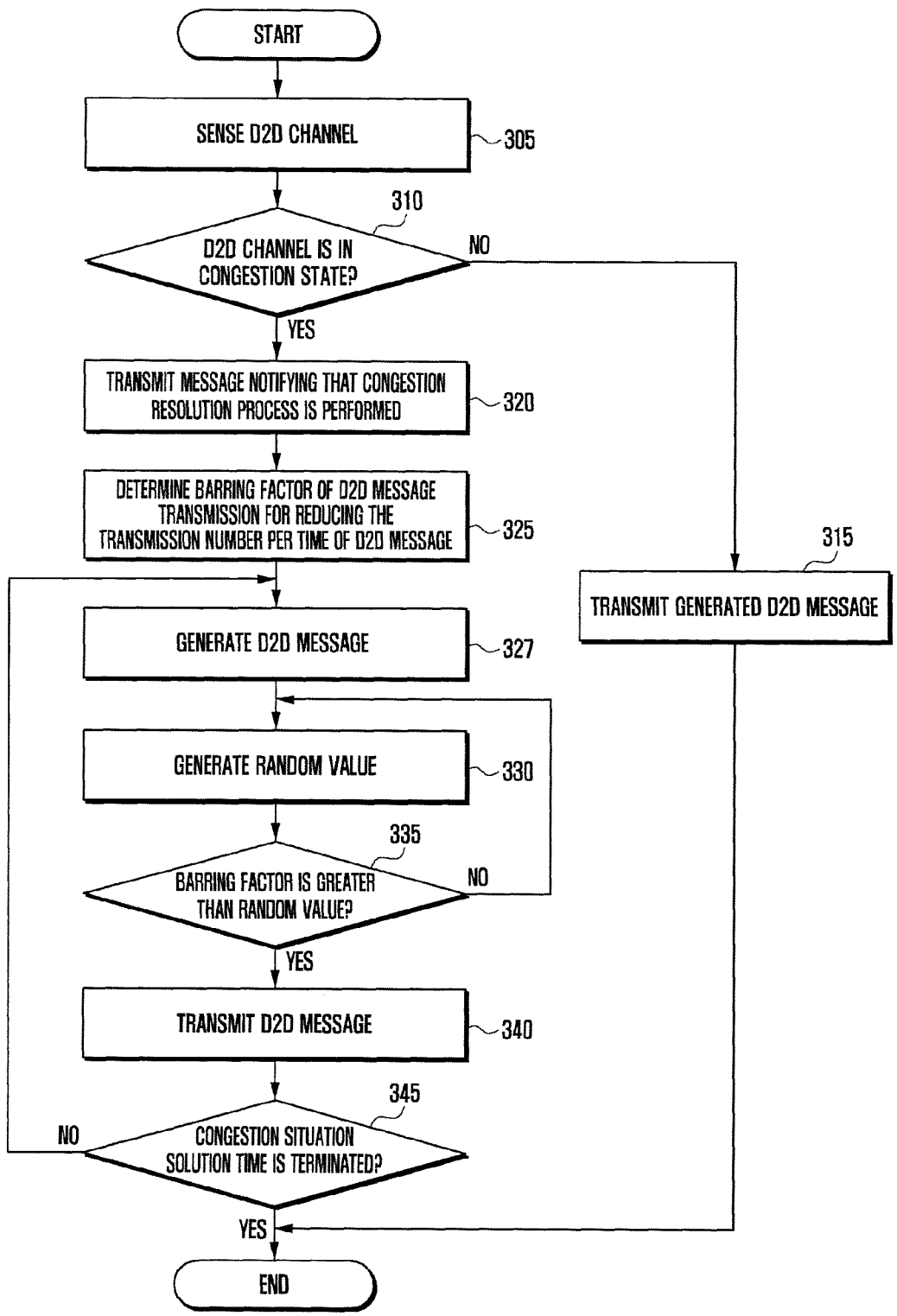
FIG. 3 is a flowchart illustrating a congestion resolution operation of a user terminal according to an exemplary embodiment of the present disclosure.

FIG. 3 is a flowchart illustrating a congestion resolution operation of a UE according to an exemplary embodiment of the present disclosure.

A UE in which a D2D communication function is activated periodically senses a D2D channel (305). Even when a specific situation, such as a case in which a user's specific input is detected, has occurred, the UE may sense a D2D channel.

The UE may analyze a result of sensing of the D2D channel and determine whether the D2D channel is in a congestion state according to a predetermined reference (310). The predetermined reference may include at least one of an occupying rate of a resource block, an average consumption time taken for transmission of a D2D message, the average transmission trial number for a predetermined time, or an average consumption time for reception of a response message.

According to an exemplary embodiment of the present disclosure, a reference that determines whether a D2D channel is in a congestion state may include an occupying rate of a resource block for a predetermined time or for a predetermined frame. When calculating the occupying rate, if a message collision occurs at a specific resource block, the occupying rate may be calculated by including a corresponding resource block in an occupying resource block and may be calculated by not including a corresponding resource block in an occupying resource block. According to an exemplary embodiment of the present disclosure, a network operator may set a boundary value of the occupying rate through the OMA-DM server 160. According to an exemplary embodiment of the present disclosure, the UE may report information about the occupying rate to a base station or a D2D server. The base station or the D2D server may determine whether a D2D channel is in a congestion state based on the reported information about an occupying rate.

According to another exemplary embodiment of the present disclosure, a reference that determines whether a D2D channel is in a congestion state may include an average time of consumption times taken from when the UE attempts to send a D2D message for a predetermined time or by the predetermined number until the UE successfully sends the D2D message. According to an exemplary embodiment of the present disclosure, the UE may report information about the average consumption time to the base station or the D2D server. According to an exemplary embodiment of the present disclosure, the base station or the D2D server may determine whether a D2D channel is in a congestion state based on the reported information about an average consumption time.

According to another exemplary embodiment of the present disclosure, a reference that determines whether a D2D channel is in a congestion state may include an average of the number in which the UE has attempted transmission in order to send a D2D message for a predetermined time. According to an exemplary embodiment of the present disclosure, the UE may report information about the average transmission trial number to the base station or the D2D server. According to an exemplary embodiment of the present disclosure, the base station or the D2D server may determine whether a D2D channel is in a congestion state based on the reported information about the average number of transmission trials.

According to another exemplary embodiment of the present disclosure, a reference that determines whether a D2D channel is in a congestion state may include an average time of consumption times taken from when the UE transmits a D2D message for a predetermined time or by a predetermined number until the UE receives a response message. When calculating an average time of the consumption times, the average time of the consumption times may be calculated, except for a case in which the UE does not receive a response message. According to an exemplary embodiment of the present disclosure, the UE may report information about an average consumption time for reception of the response message to the base station or the D2D server. According to an exemplary embodiment of the present disclosure, the base station or the D2D server may determine whether a D2D channel is in a congestion state based on the reported information about an average consumption time for reception of the response message.

A reference that determines whether a D2D channel is in a congestion state is not limited to the described reference and may include only a reference that is not described or may include both the described reference and a reference that is not described.

When the UE determines that the D2D channel is not in a congestion state and when a D2D message is newly generated according to a time lapse or according to a user input, the UE may immediately transmit the newly generated D2D message (315).

If the D2D channel is in a congestion state, the UE may transmit a message notifying that a congestion resolution process is performed (320). For example, the UE may broadcast a congestion resolution message. The congestion resolution message may include information such as D2D application ID in which the UE uses or Group ID of a Group to which the UE belongs.

If a D2D channel is in a congestion state, the UE may determine a barring factor of D2D message transmission for reducing the transmission number per time of a D2D message (325). For example, the UE may allocate a value between 0 and 1 to a threshold in consideration of a congestion level of the D2D channel. The UE may directly set a threshold, and a network operator may set a threshold through the OMA-DM server 106. When setting a threshold through the OMA-DM server, the threshold may be set in consideration of a priority of a corresponding UE in a network. The UE may set a barring factor and may separately determine a termination time of a congestion resolution process to which the barring factor is applied.

When a D2D message is newly generated (327), the UE may generate a random value corresponding to the generated message (330). For example, the UE may generate a random value between 0 and 1. The UE may compare a magnitude of a barring factor (threshold) determined at operation 325 and a magnitude of the random value generated at operation 330 and determine whether the magnitude of the barring factor is greater than the magnitude of the random value (335).

If the magnitude of the barring factor is greater than the magnitude of the random value, the UE may immediately transmit a D2D message corresponding to the random value (340). If the magnitude of the barring factor is not greater than the magnitude of the random value, the UE may discard a D2D message instead of transmitting a D2D message corresponding to the random value and delay transmission of the D2D message. Thereafter, the UE may generate a new random value (330) and determine whether the magnitude of the barring factor is greater than a magnitude of a new random value (335). According to another exemplary embodiment of the present disclosure, if the magnitude of the barring factor is smaller than the magnitude of the random value, the UE may set immediate transmission of a D2D message corresponding to the random value.

At operations 325 to 350, the UE determines a threshold based on sensing of the D2D channel, maps a random value of each newly generated D2D message, compares magnitudes of the threshold and the random value, and limits transmission of a D2D message corresponding to the random value based on a comparison result. Accordingly, the transmission number per time of the D2D message has a reducing probability.

Thereafter, the UE determines whether a congestion resolution time is terminated (345). As shown in FIG. 3, before a congestion resolution time is terminated, when a D2D message is newly generated according to time lapse or according to a user input (327), the UE again generates a random value of a corresponding D2D message (330) and repeats the following operations until a congestion resolution time is terminated.

Figure 4:
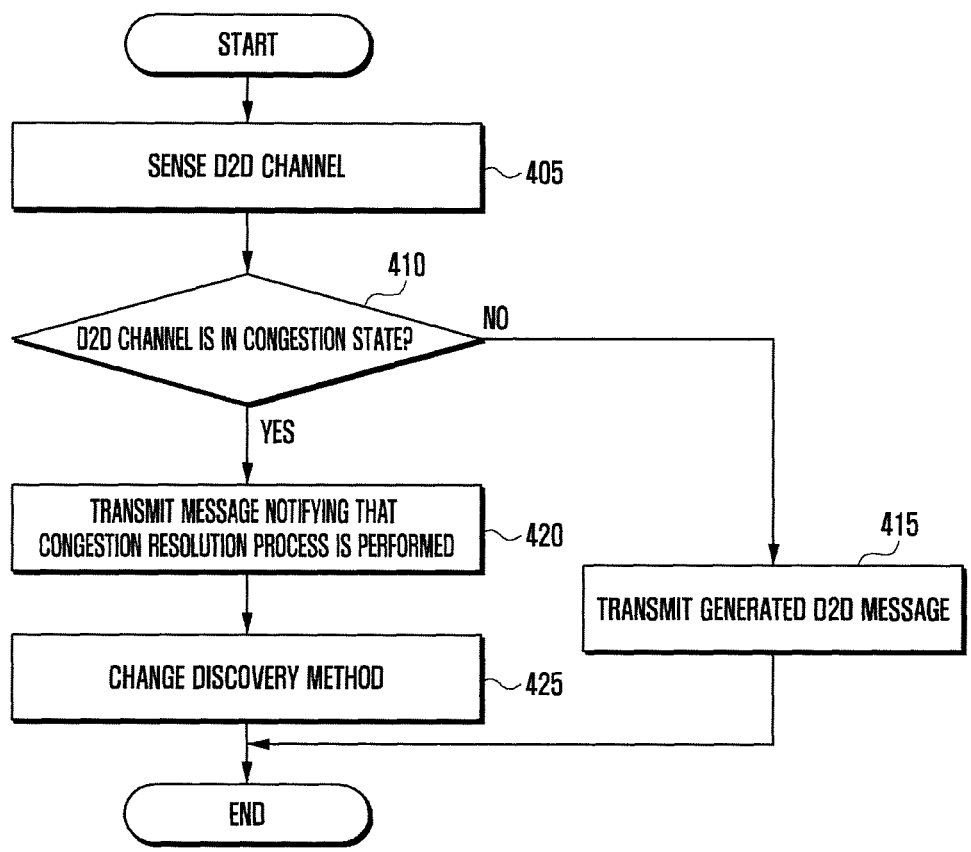
FIG. 4 is a flowchart illustrating a congestion resolution operation of a user terminal according to another exemplary embodiment of the present disclosure.

FIG. 4 is a flowchart illustrating a congestion resolution operation of a UE according to another exemplary embodiment of the present disclosure.

A UE in which a D2D communication function is activated senses a D2D channel (405). The UE may analyze a result of sensing of the D2D channel and determine whether the D2D channel is in a congestion state according to a predetermined reference (410). If the D2D channel is not in a congestion state, the UE may newly generate and immediately transmit a D2D message (415). If the D2D channel is in a congestion state, the UE may transmit a message notifying that a congestion resolution process is performed (420). Operations 405 to 420 are similar to operations 305 to 320 of FIG. 3 and therefore a detailed description thereof will be omitted.

In order to discover an adjacent terminal of interest, the UE may broadcast a discovery message including information of another UE to discover. Such a discovery method is referred to as a search-response method. Hereinafter, in order to distinguish from a discovery message of an announce-monitoring mode, a discovery message of a search-response method is referred to as a search message. The discovery message of a search-response method is transmitted to discover an adjacent terminal of interest, similarly to a discovery message of an announce-monitoring mode, but unlike a discovery message of an announce-monitoring mode, the discovery message of a search-response method is different from the discovery message of an announce-monitoring mode in that the discovery message of an announce-monitoring mode includes information of a desired UE. When an UE, having received the search message is a UE having information corresponding to information included in the search message, the UE may transmit a response message notifying that the UE is adjacently located, to the UE, having broadcasted the search message. In the search-response method, because a UE is searching only for a terminal of interest instead of an entire UE by transmission of a discovery message, a possibility that the D2D channel is in a congestion state may be lower than that in case of an announce-monitoring mode. In this specification and claims, only two kinds of discovery methods are described, but a kind of discovery method is not limited thereto.

If the D2D channel is in a congestion state, the UE may change a discovery method (425). For example, the UE may change an announce-monitoring mode to a search-response method.

FIGS. 3 and 4 illustrate an example of reducing the transmission number per time of a D2D message or an example of changing a discovery method when the UE detects a congestion state of a D2D channel. According to another exemplary embodiment of the present disclosure, a congestion resolution process of FIG. 3 and a congestion resolution process of FIG. 4 may be together performed. In this case, a boundary value that triggers each congestion resolution process may be differently set.

Figure 5:
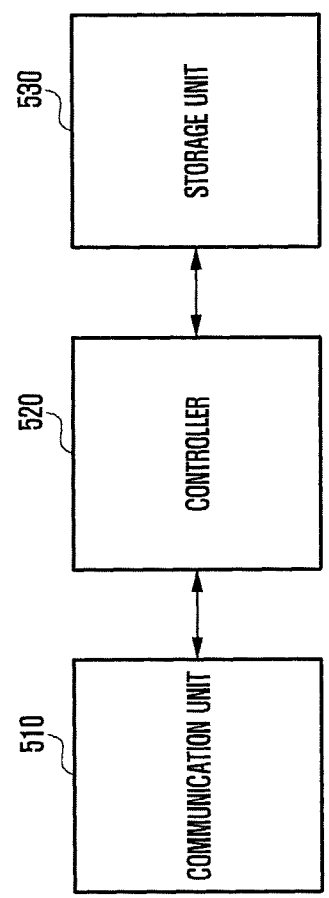
FIG. 5 is a block diagram illustrating a configuration of a server according to an exemplary embodiment of the present disclosure.

FIG. 5 is a block diagram illustrating a configuration of a server according to an exemplary embodiment of the present disclosure.

Referring to FIG. 5, the server may include a communication unit 510, controller 520, and storage unit 530.

The communication unit 510 may form a communication channel for data transmission and reception with the UE or another server under the control of the controller 520. The communication unit 510 may communicate with the UE by wireless and may communicate with another server by wire. For example, the communication unit 510 may receive sensing information of a D2D channel from the UE.

The controller 520 may include a microprocessor or a microcomputer such as a Central Processing Unit (CPU) and a Digital Signal Processor (DSP). The controller 520 may receive a report of sensing information of a D2D channel from the UE, determine that a D2D channel is in a congestion state based on the sensor information, and control various signal flows for solving congestion, such as transmission of a congestion state indication message to the UE. For example, the controller 520 may determine a congestion possibility of a network to which the UE belongs and control the communication unit to notify the UE that belongs to the network of information about a congestion possibility.

The storage unit 530 may include a cache memory, D-ram, S-ram, flash memory, magnetic disk storage device, or optical disk storage device. The storage unit 530 may store information related to a congestion resolution of D2D communication and a D2D channel.

Figure 6:
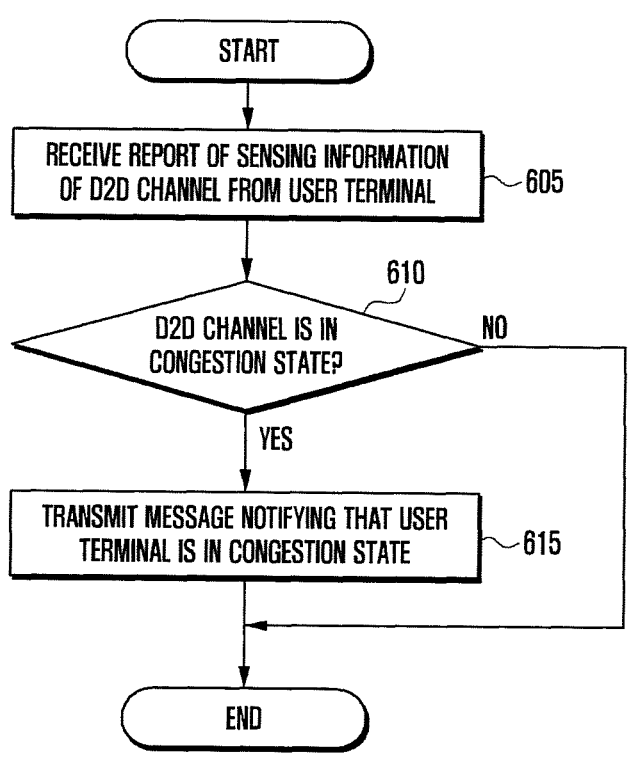
FIG. 6 is a flowchart illustrating a congestion resolution operation of a server according to an exemplary embodiment of the present disclosure.

FIG. 6 is a flowchart illustrating a congestion resolution operation of a server according to an exemplary embodiment of the present disclosure.

A server located on a network interworked with the UE or a server interworked with the network may receive a report of sensing information of a D2D channel from the UE (605). The server may analyze the reported sensing information and determine whether a D2D channel of the UE, having received the report of sensing information according to a predetermined reference is in a congestion state (610). The predetermined reference may include at least one of an occupying rate of a resource block, an average consumption time taken for transmission, the average transmission trial number, or an average consumption time for transmission of a response message. If a D2D channel is in a congestion state, the server may transmit a message notifying that the UE, having reported sensing information is in a congestion state (615). The message transmitted at operation 615 may correspond to transmission of a unicast message or broadcast of a System Information Block (SIB). The message transmitted at operation 615 may include a discovery method or a setting value related to a congestion resolution of a D2D channel. For example, the server may determine a barring factor of D2D message transmission for reducing the transmission number per time of a D2D message and include the barring factor in the message transmitted at operation 615.

Figure 7:
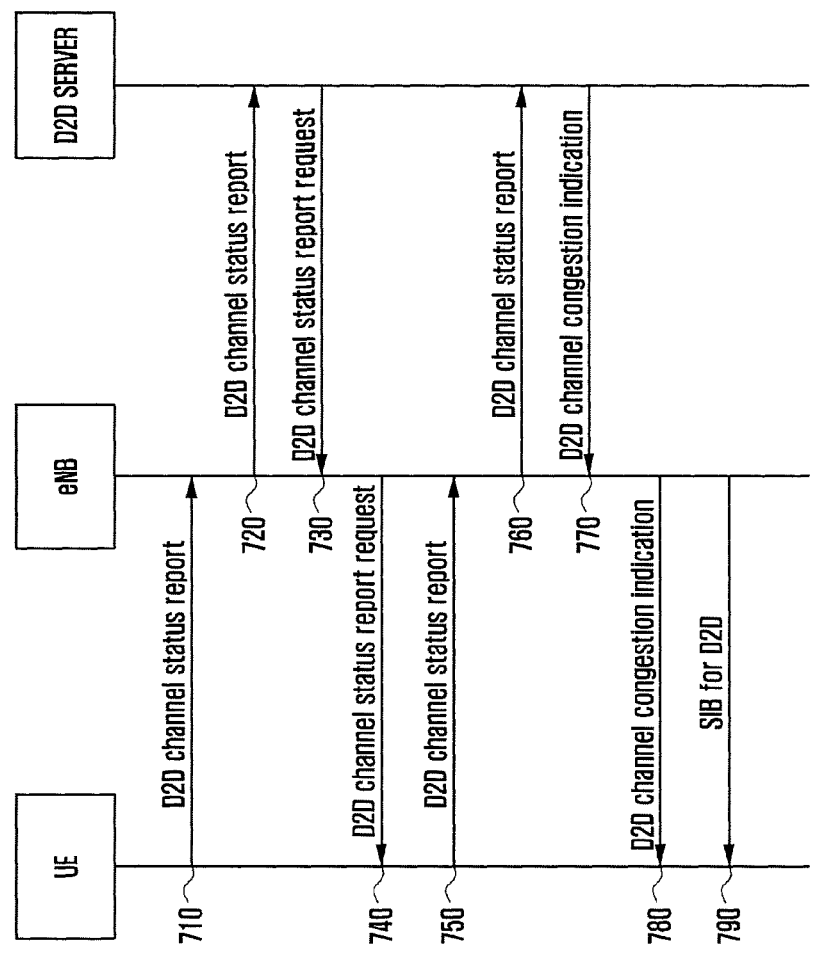
FIG. 7 is a message flow diagram illustrating message transmission and reception between a user terminal and a server for solving congestion of a D2D channel according to an exemplary embodiment of the present disclosure.

FIG. 7 is a message flow diagram illustrating message transmission and reception between a UE and a server for solving congestion of a D2D channel according to an exemplary embodiment of the present disclosure.

The UE may periodically transmit a D2D channel status report message including a traffic situation of a D2D channel to an eNB (710). When a specific situation occurs, the UE may transmit the D2D channel status report message to the server. The D2D channel status report message may include information about at least one of an occupying rate of a resource block sensed by the UE, an average consumption time taken for transmission, the average transmission trial number, or an average consumption time for reception of a response message. The eNB may transmit the received D2D channel status report message to a D2D server (720).

The D2D server may transmit a D2D channel status report request message to the eNB (730). The eNB may transmit the D2D channel status report request message to the UE (740). The UE, having received the request message may transmit the D2D channel status report message as a response to the eNB (750). The eNB may transmit the D2D channel status report message to the D2D server (760). According to an exemplary embodiment of the present disclosure, the eNB may receive a report of sensing information from the UE and determine whether the UE is in a congestion state based on the report. When the eNB instead of the D2D server performs a congestion resolution process of the UE, operations 720 and 730 may be omitted.

The D2D server may analyze the D2D channel status report message received from the UE and transmit a D2D channel congestion indication message to the UE based on the D2D channel status report message. The D2D channel congestion indication message may include a discovery method or a setting value related to a congestion resolution of a D2D channel. For example, when the D2D server, having received the D2D channel status report message determines that congestion has occurred in the network, the D2D server may transmit the D2D channel congestion indication message to the eNB (770). The eNB, having received the D2D channel congestion indication message may transmit the D2D channel congestion indication message to the UEs (780). When the eNB instead of the D2D server determines that congestion has occurred in a control area thereof, operations 760 and 770 may be omitted. The D2D channel congestion indication message at operation 780 may correspond to a unicast message. Further, the eNB may notify congestion of a D2D channel by a method of broadcasting a SIB instead of unicast message transmission (790). Tables 1 and 2 illustrate a SIB for notifying congestion of a D2D channel according to an exemplary embodiment of the present disclosure.

TABLE 1

| SIB-D2D |
|---|
| -allowed discovery mechanism { |
|   -self-announcement : 1 or 0 |
|   -search-response : 1 or 0 |
| } |

Table 1 illustrates a SIB that instructs a discovery method according to an exemplary embodiment of the present disclosure. Referring to Table 1, the SIB may include a setting value on whether an announce-monitoring mode and a search-response method are allowed. For example, in order to allow only an announce-monitoring mode, a SIB message in which a setting value of an announce-monitoring mode is 1 and in which a setting value of a search-response method is 0 may be broadcasted. Thereafter, when a SIB message in which a setting value of an announce-monitoring mode is 0 and in which a setting value of a search-response method is 1 is broadcasted, the UE, having received the SIB message may change a discovery method to a search-response method.

TABLE 2

| SIB-D2D |
|---|
| -D2D message barring configuration |
| { |
|   -message barring factor [0, 1) |
|   -message barring timer |
|   -UE category(e.g. commercial) or group ID |
| } |

Table 2 illustrates a SIB that instructs a setting value related to a congestion resolution of a D2D channel according to an exemplary embodiment of the present disclosure. Referring to Table 2, a message barring factor means a barring factor of D2D message transmission, and a message barring time means a congestion resolution time. According to an exemplary embodiment of the present disclosure, the server may enable extraction of a random value between 0 and 1 when UEs corresponding to a corresponding UE category or Group ID transmit a D2D message for a message barring time and transmission of the D2D message only when a value smaller than the message barring factor is extracted.

The UE, having received the D2D channel congestion indication message of operation 780 or the SIB of operation 790 may perform a congestion resolution process according to a discovery method or a setting value related to a congestion resolution of a D2D channel included in the D2D channel congestion indication message.

Figure 8:
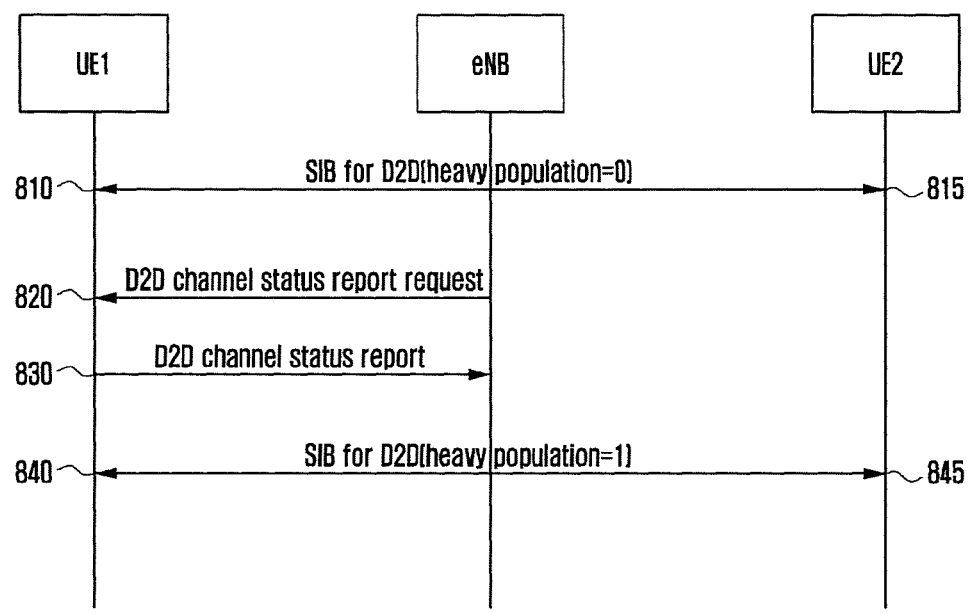
FIG. 8 is a message flow diagram illustrating message transmission and reception between a user terminal and a server for solving congestion of a D2D channel according to another exemplary embodiment of the present disclosure.

FIG. 8 is a message flow diagram illustrating message transmission and reception for solving congestion of a D2D channel between a UE and a server according to another exemplary embodiment of the present disclosure.

Referring to FIG. 8, the eNB periodically notifies UEs whether a congestion possibility exists in a network (control area) thereof through the SIB (810, 815, 840, and 845). FIG. 8 illustrates an eNB, but this may be applied to another base station or a D2D server. In this case, according to an exemplary embodiment of the present disclosure, the SIB may include a heavy population indicator that may have a value of 1 or 0 representing whether a congestion possibility exists within a base station area. Therefore, when a heavy population indicator=1, even if the UE is not in congestion, congestion occurs at any location of a network to which the UE belongs and thus a possibility in which at least one of adjacent terminals is in a congestion resolution process may be recognized.

While sensing a traffic situation of a D2D channel, when the UE1 periodically receives a request for a D2D channel status report from the eNB (820), the UE1 may transmit a D2D channel status report message to the eNB (830). The D2D channel status report message may include an occupying rate of a resource block per D2D channel frame sensed by the UE1. The eNB determines whether congestion has occurred within a corresponding base station area in consideration of D2D channel situations collected from UEs and broadcasts a congestion occurrence possibility in a D2D channel of a network to which the UE belongs, to UEs using a SIB including a heavy population indicator.

If D2D channel congestion occurs, the eNB sets the heavy population indicator included in the SIB to 1 and broadcasts the SIB (840, 845). The UE1, having recognized that the D2D channel sensed by the UE1 is in a congestion state may receive a SIB including a heavy population indicator=1 and perform a congestion resolution process. The congestion resolution process may include a change of a discovery message transmission method from an announce-monitoring mode to a search-response method or transmission limitation of a D2D message. The UE2, having recognized that the D2D channel sensed by the UE2 is not in a congestion state may receive a SIB including a heavy population indicator=1 and may not perform a congestion resolution process. In this case, as congestion occurs in the network, the UE2 may determine that an adjacent terminal of the UE2 is in a congestion resolution process. In this case, in order to solve congestion, the UE2 may change a discovery message transmission method from an announce-monitoring mode to a search-response method and discover a terminal of interest that is not discovered with the announce-monitoring mode. Further, in order to solve congestion, the UE2 solving congestion by reducing the transmission number per time of the D2D message may adjust message response standby timer values in consideration of transmission delay of a D2D message due to transmission limitation.

According to another exemplary embodiment of the present disclosure, when the UE1, having received a SIB including the heavy population indicator=1 and recognizing as congestion according to a situation of the D2D channel sensed by the UE1 starts a congestion resolution process (840), in order to notify adjacent terminals that the UE1 has entered the congestion resolution process, the UE1 may broadcast a congestion resolution message and start the congestion resolution process. The congestion resolution message may include information such as D2D application ID in which the UE uses or Group ID of a Group to which the UE belongs. According to an exemplary embodiment of the present disclosure, when the UE, having received a resolution message including the same D2D application ID or Group ID is not in congestion, the UE may not perform a congestion resolution process and may operate in consideration that an adjacent terminal is in a congestion resolution process. According to another exemplary embodiment of the present disclosure, even when the UE, having received a resolution message including the same D2D application ID or Group ID is not in congestion, the UE may perform a congestion resolution process.

Figure 9:
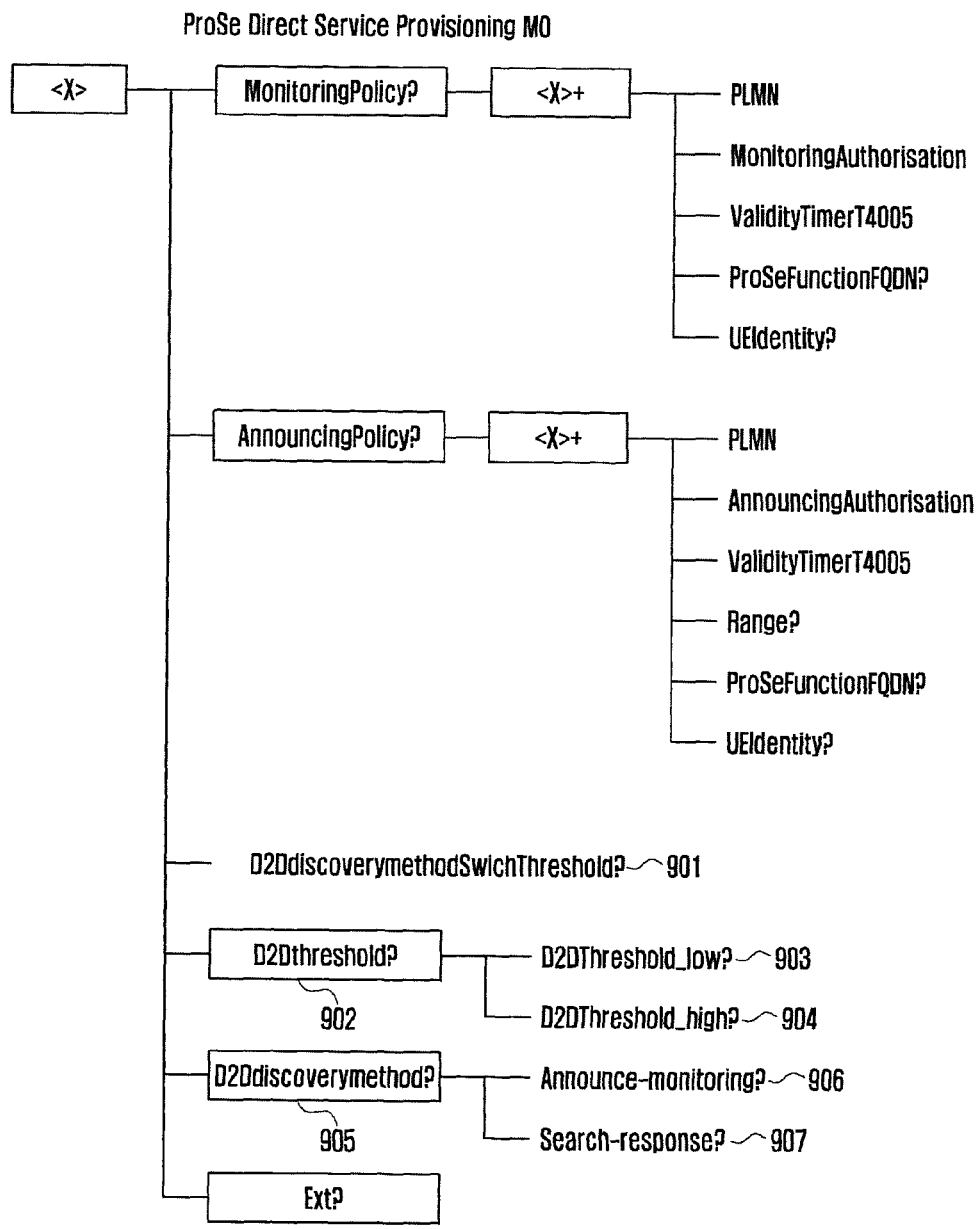
FIG. 9 is a diagram illustrating a structure of Proximity-Services (ProSe) Direct Service Provisioning Management Objects (MO) used for setting a boundary value related to a congestion resolution through an OMA-DM server according to an exemplary embodiment of the present disclosure.

FIG. 9 is a diagram illustrating a structure of Proximity-Services (ProSe) Direct Service Provisioning Management Objects (MO) used for setting a boundary value related to a congestion resolution through an OMA-DM server according to an exemplary embodiment of the present disclosure.

FIG. 9 illustrates a reference in which the OMA-DM server determines whether a D2D channel is in a congestion state.

A boundary value for changing a discovery method may be given, as in a D2DdiscoverymethodSwitchThreshold rib 901. The D2DdiscoverymethodSwitchThreshold rib 901 may have a value between 0 and 1. According to an exemplary embodiment of the present disclosure, when an occupying rate of a resource block per frame sensed by a UE is greater than a setting value of the D2DdiscoverymethodSwitchThreshold rib 901, the OMA-DM server changes a discovery method from an announce-monitoring mode to a search-response method.

A boundary value of a reference in which the UE determines whether a D2D channel is in a congestion state may be given, as in a D2Dthreshold 902. When dividing and setting on an operation basis, under the D2Dthreshold node 902, each of D2Dthreshold_low 903 and D2Dthreshold_high 904 ribs may be disposed. The D2Dthreshold node 902, D2Dthreshold_low 903, and D2Dthreshold_high 904 ribs each may be set to have a value between 0 and 1. The UE may compare an occupying rate of the sensed resource block per frame with the setting values and determine whether a D2D channel is in a congestion state, thereby adjusting a barring factor value.

In order to notify the UE of a discovery method, under a D2Ddiscovery method node 905, announce-monitoring 906 and Search-response 907 ribs are disposed and it may be set whether an announce-monitoring mode and a search-response method may be each used. A discovery method of the terminal may be determined according to several factors such as congestion of a D2D channel or preference of a provider. Further, as the discovery method, both an announce-monitoring mode and a search-response method may be used. Because a MonitoringPolicy node and an AnnouncingPolicy node may be applied in common in an announce-monitoring mode and a search-response method, in the search-response method, the MonitoringPolicy node may be used as a node for a search message policy and the AnnouncingPolicy node may be used as a node for a response message policy. However, unlike a case of FIG. 9, for a search-response method, in addition a SearchPolicy node having the same rib as that of the MonitoringPolicy node and a ResponsePolicy node having the same rib as that of the AnnouncingPolicy node may be separately formed as a node of the same level to ProSe Direct Service Provisioning MO.

The invention claimed is:

1. A method of a terminal in device-to-device (D2D) communication, the method comprising:
   sensing a D2D channel;
   determining whether the D2D channel is in a congestion state based on the sensing;
   determining a threshold based on the sensing, if the D2D channel is in a congestion state;
   mapping a random value to a generated D2D message;
   comparing the threshold with the random value; and
   controlling a transmission number per time for the generated D2D message based on a result of the comparison.

2. The method of claim 1, wherein determining whether the D2D channel is in a congestion state based on the sensing comprises determining, based on at least one of an occupying rate of a resource block, an average consumption time taken for transmission of a D2D message, an average transmission trial number for a predetermined time, or an average consumption time for reception of a response message.

3. The method of claim 1, wherein determining whether the D2D channel is in a congestion state based on the sensing comprises determining whether the D2D channel is in a congestion state based on the sensing in consideration of information about a congestion possibility received from a server.

4. The method of claim 1, further comprising changing, if the D2D channel is in a congestion state, a discovery method.

5. The method of claim 4, wherein changing a discovery method comprises changing from an announce-monitoring mode comprising information of a user terminal in a discovery message to a search-response method comprising information of another user terminal to discover in a discovery message.

6. A terminal, comprising:
a communication unit configured to sense a device-to-device (D2D) channel; and
a controller configured to:
determine whether the D2D channel is in a congestion state based on the sensing,
determine a threshold based on the sensing, if the D2D channel is in a congestion state,
map a random value to a generated D2D message,
compare the threshold with the random value, and
control a number of transmissions per time for the generated D2D message based on a result of the comparison.

7. The terminal of claim 6, wherein the controller is further configured to determine whether the D2D channel is in a congestion state based on at least one of an occupying rate of a resource block, an average consumption time taken for transmission of a D2D message, an average transmission trial number for a predetermined time, or an average consumption time for reception of a response message.

8. The terminal of claim 6, wherein the controller is further configured to determine whether the D2D channel is in a congestion state in consideration of information about a congestion possibility received from a server.

9. The terminal of claim 6, wherein the controller is further configured to change a discovery method, if the D2D channel is in a congestion state.

10. The terminal of claim 9, wherein the controller is further configured to change from an announce-monitoring mode of comprising information of a user terminal in a discovery message to a search-response method of comprising information of another user terminal to discover in a discovery message when changing a discovery method.

11. A method of a server interworked with at least one terminal in device-to-device (D2D) communication, the method comprising:
receiving a sensing information of a D2D channel from the terminal;
determining whether the D2D channel is in a congestion state based on the sensing information;
determining a threshold based on the sensing information, if the D2D channel is in a congestion state;
mapping a random value to a generated D2D message;
comparing the threshold with the random value; and
transmitting a congestion state indication message to the terminal to control a number of transmission per time for the generated D2D message based on a result of the comparison.

12. The method of claim 11, wherein transmitting a congestion state indication message to the terminal comprises transmitting a unicast message or broadcasting a system information block (SIB).

13. The method of claim 11, further comprising determining a barring factor of a D2D message transmission for reducing the transmission number per time of a D2D message.

14. The method of claim 11, wherein a SIB includes a setting value on whether an announce-monitoring mode and a search-response method are allowed.

15. A server, comprising:
a communication unit configured to receive sensing information of a D2D channel from a terminal; and
a controller configured to:
determine whether the D2D channel is in a congestion state based on the sensing information, and
control the communication unit to:
determine a threshold based on the sensing information, if the D2D channel is in a congestion state,
map a random value to a generated D2D message,
compare the threshold with the random value,
transmit a congestion state indication message to the terminal to control a transmission number per time for the generated D2D message based on a result of the comparison.

16. The server of claim 15, wherein the communication unit is further configured to transmit a unicast message or broadcasts a system information block (SIB) when transmitting a congestion state indication message.

17. The server of claim 15, wherein the controller is further configured to determine a barring factor of a D2D message transmission for reducing the transmission number per time of a D2D message.

18. The server of claim 15, wherein a SIB includes a setting value on whether an announce-monitoring mode and a search-response method are allowed.

* * * * *